Dec. 12, 1967   R. H. ANDERSON ETAL   3,357,583
PLASTIC CAPS FOR MILK BOTTLES
Filed May 16, 1966
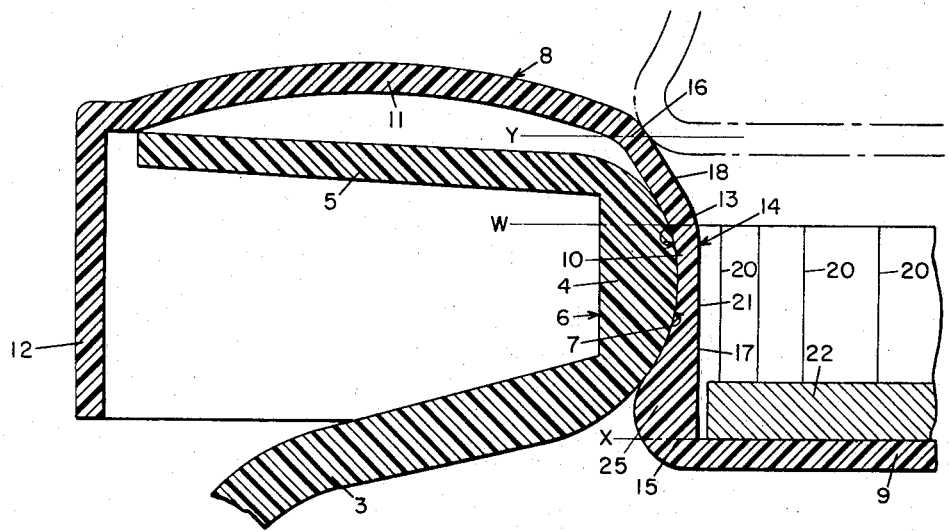
FIG. 3
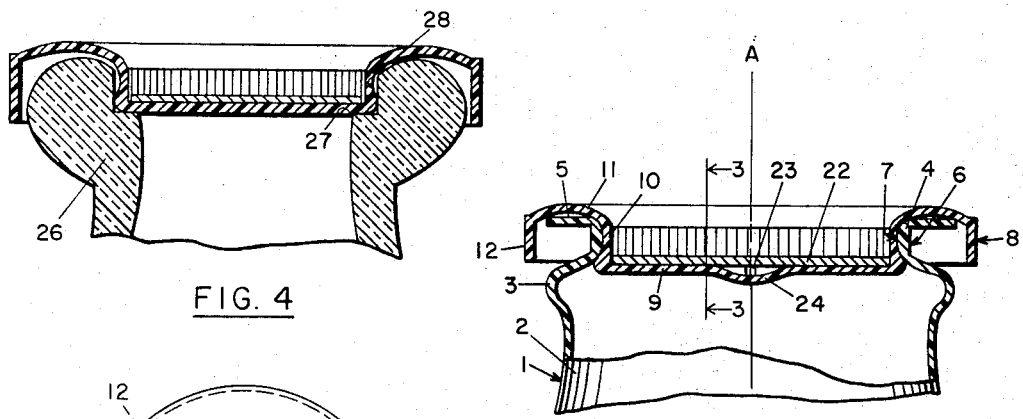
FIG. 4
FIG. 2
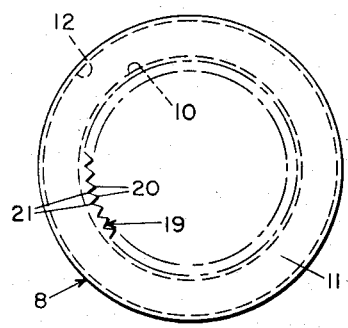
FIG. 1
RUSSELL H. ANDERSON
JOHN P. CAMPANELLI
INVENTORS
BY *Edward L. Bell*
ATTORNEY 3,357,583
PLASTIC CAPS FOR MILK BOTTLES
Russell H. Anderson, Hartsdale, and John P. Campanelli, Bethpage, N.Y., assignors to Haskon, Inc., Long Island City, N.Y., a corporation of Delaware
Filed May 16, 1966, Ser. No. 550,472
5 Claims. (Cl. 215—38)

ABSTRACT OF THE DISCLOSURE

This invention relates to an injection molded plastic closure such as a plug-type cap that is used for example on milk bottles, the cap being characterized in that the peripheral wall of the plug portion has an outwardly facing sealing surface and an inwardly facing outside surface, the sealing surface being bowed from a minimum thickness at a point adjacent the midpoint of the wall to a maximum thickness at the bottom of the wall to provide a bead, and the outside surface having a plurality of vertical ribs that extend from the bottom of the wall to beyond the midpoint vertically thereof.

---

The present invention relates to closures for containers such as milk bottles and the like, and particularly to plastic closures.

The objects of this invention are to provide a plastic closure which is adapted for use with different containers, for example, with glass or plastic milk bottles, and which, when applied to the container, will be securely held in place against dislodgment during normal use and will seal the mouth of the container without leakage. It is also an object of this invention to provide such a closure which is adapted to be manufactured in mass quantities with uniform quality and at prices competitive with present closures, for example, paper closures. Further objects of this invention are to provide a plastic closure, particularly for milk bottles, which includes a cover portion for covering for sanitary purposes the pouring lip of the container, and to provide a plastic closure adapted to be applied to the container by existing capping machines.

Briefly, the objects of this invention are realized by a plastic closure of the cap-type, that is, a closure having a plug portion including a diaphragm and a plug wall and a cover portion for the pouring lip of the container, including a rim and a depending skirt, all of which parts are formed integrally as by injection molding. The outer side of the plug wall radially of the closure, which is herein termed the sealing surface, is adapted to cooperate with the sealing surface of the container in sealing engagement and includes a sealing bead about the periphery thereof for stiffening the bottom of the wall and for assisting in forming the seal. The other surface of the wall, that is, the one at the radially innermost side of the wall, is herein termed the outer surface in that it is the exposed surface when the closure is on the container. This outer surface is formed with ridges longitudinally thereof, which facilitate manufacture by injection molding and strengthen the wall against bending, thereby assisting in holding the opposite or sealing surface of the wall in sealing engagement with the sealing surface of the container.

With the above and other objects in view, a presently preferred embodiment of the present invention is hereinafter described with reference to the accompanying drawings, in which:

FIG. 1 is a top plan view of a closure embodying the present invention.

FIG. 2 is a fragmentary view, partly in section and partly in elevation, of a container with the closure of FIG. 1 thereon.

FIG. 3 is a detailed sectional view on an enlarged scale and taken substantially at the line 3—3 of FIG. 2.

FIG. 4 is a view similar to FIG. 2 but showing the closure of FIG. 1 on a glass container in lieu of the plastic container of FIG. 2.

With reference to the drawings, there is illustrated a plastic container 1 having a neck 2 which at its mouth is provided with a finish such as that which forms the subject matter of copending application Ser. No. 550,485, filed May 16, 1966, which application is a continuation-in-part of application Ser. No. 473,736, filed July 21, 1965, and now abandoned. This finish comprises an outwardly bowed bead 3 disposed between the neck 2 and a sealing wall 4, and an annular flange or pouring lip 5 extending outwardly from the top of the wall 4. The container 1 is adapted to be formed of plastic, as by blow molding, and the wall 4, therefore, has a substantially straight outer surface 6, which was formed against the molding surface and a sealing surface 7, against which the blowing pressure was applied and which is, therefore, curved or bowed as the plastic material from which the container is formed was folded during the blowing operation over the mold surface for forming the outside of the wall 4 and expanded into the flange 5 and bead 3.

The mouth of the container 1 is adapted to be closed by a closure comprising a plug portion including a diaphragm 9 and a wall 10 upstanding from the periphery of the diaphragm 9 and having the space within the same closed at the bottom by the diaphragm 9, and a cover portion including a substantially annular rim 11 that extends outwardly from the top of the wall 10 and at its periphery carries a depending skirt 12 that is disposed in spaced or opposed relation to the wall 10. The illustrated closure is circular and the wall 10 is, therefore, cylindrical about the center line A. The side of the wall 10 that is outwardly in the direction laterally or radially from the center line A, that is, the direction normal to the center line A, constitutes the sealing surface 13, which surface is adapted to cooperate in sealing engagement with the sealing surface 7 of the container and is bowed to conform substantially to the configuration of the sealing surface 7. The other side of the wall 10, that is, the side that is inwardly in the direction laterally from the center line A and that is opposite from the sealing surface 7, constitutes the exposed or outside surface 14 of the wall.

The closure as above described constitutes the usual cap-type milk bottle closure. The present invention relates specifically to the formation of the wall 10 of such a closure as hereinafter described.

The present closure is adapted to be formed as a single one-piece plastic element that is formed, for example, by injection molding. While the wall 10 is therefore integral with the diaphragm 9 and the rim 11 it is for convenience herein referred to as having a bottom edge and a top edge, which are, respectively, indicated at 15 and 16 in FIG. 3, and are disposed in planes X and Y, both of which are normal to the center line A.

The outside surface 14 of the wall 10 is divided longitudinally, that is, in the direction parallel to the center line A, by a plane W into a lower portion 17, extending from the bottom edge 15 to the plane W, and an upper portion 18, extending from the plane W to the top edge 16. The plane W is parallel to the planes X and Y and normal to the center line A, and is preferably disposed beyond the longitudinal midpoint of the wall in the direction from the bottom edge 15 toward the top edge 16, whereby the lower portion 17 is longer than the upper portion 18.

The lower portion 17 of the outside surface 14 is, at all points about the wall 10, straight longitudinally of the wall and parallel to the center line A. In cross-section, that is, in a plane normal to the center line A, the outside surface 14 is formed with undulations or in a zigzag manner so that it has increasing and decreasing dimensions laterally relative to the center line A to define ridges 20 and valleys 21. In the illustrated example, there is a continuous succession of relatively fine ridges 20 about the surface 17. The purpose of the ridges 20 is to provide longitudinal reinforcement for the wall 10 so that, with a minimum of material, there will still be sufficient longitudinal rigidity in the wall 10 to hold the sealing surface 13 thereof in sealing engagement with the cooperating sealing surface 7 of the container. The ridges 20 also help to hold a disk 22 in place on the diaphragm 9 by having an interfering dimension on the disk 22 relative to the tops of the ridges 20 so that the disk must be forced into position with the tops of the ridges biting into the edge of the disk. In the usual manner, the disk 22 may be formed of paper and may be used to reinforce the diaphragm 9 or to provide a printing surface.

The closure 8 is preferably injection molded from a plastic, such as high-impact polystyrene. The lower portion 17 of the outside surface 14 of the wall 10 is adapted to be formed by a male mold member that can be readily withdrawn without interference with the molded part because of the cylindrical configuration thereof. The input or injection point of the molten plastic is at the midpoint of the diaphragm 9, to accommodate the remnants of the runner, which is illustrated at 23 in FIG. 2, without interfering with the seating of the disk 22, and thus to avoid the necessity of accurately trimming the runner, the center portion 24 of the diaphragm 9 is dished downwardly to provide a space between the disk and the diaphragm.

The thickness of the diaphragm 9, rim 11 and skirt 12 of the closure is preferably uniform and is made as thin as reasonably possible, consistent with economical injection molding and with adequate strength and rigidity. The average thickness of the wall 10 is about the same as the uniform thickness of the diaphragm 9, rim 11 and skirt 12, and varies in thickness between a maximum at the tops of the ridges 20 that is greater than the uniform thickness and a minimum at the valleys 21 that is less than the uniform thickness. With high-impact polystyrene, the minimum thickness that can economically be formed by injection molding on a commercial basis with known technology is from about 0.020″ to about 0.030″.

With the lower portion 17 of the outside surface 14 of the wall 10 formed parallel to the center line A and the sealing surface 13 bowed to conform substantially to the curvature of the sealing surface 7 of the container, that is, bowed outwardly from a minimum lateral dimension adjacent to the plane W to an increased lateral dimension adjacent the bottom edge 5. There is produced a bead 25 at the bottom edge 15 of the wall 10 and at the periphery of the diaphragm 9. The bead 25 not only constitutes an enlargement adapted to snap under the bulge of the bowed sealing surface 7 and thereby help to hold the closure on the container, but also acts to stiffen the bottom edge 15 of the wall 10 to resist deflection thereof laterally inwardly, thereby helping to generate an increased sealing pressure between the sealing surfaces 7 and 13, which is particularly important when the closure is used with non-rigid plastic containers. The bead 25 also serves to adapt the closure for use with rigid containers such as glass milk bottles, the neck portion of which is illustrated at 26 in FIG. 4. The glass bottle 26 is formed with a seat 27 and a lateral sealing wall 28 for receiving the closure. When the present closure is used with the glass bottle 26, the bead 25 is press-fitted into the opening defined by the wall 28 and comprises the pressure point for securing the closure on the container and for sealing it against leakage.

The upper portion 18 of outside surface 14 is formed with a lateral dimension that increases progressively in the direction away from the top of the lower portion 17, which is at the plane W. This construction affords a smooth transition between the wall 10 and the rim 11 so that when a plurality of the closures are stacked, the outer edge of the bead 25 of one is seated against the wall 10 of the underlying closure substantially at the top edge 16 thereof, as illustrated by the phantom illustration in FIG. 3. The skirt 12 is short enough so that the bottom will not engage the top of the skirt of the underlying closure so that, seated only at the bead 25 and the top edge 16 of the wall 10, the closures will make a stable stack. At the same time, with the camming action afforded by the inclined upper portion 18 of the outside surface 14, the lowermost closure can be fed from the stack by the usual magazine-type feeding mechanism of existing capping machines.

What we claim and desire to protect by Letters Patent is:

1. A plastic closure for containers such as milk bottles and the like comprising an integrally formed wall, diaphragm, rim and skirt, said wall having a continuous periphery and a bottom edge and a top edge in planes normal to the center line of said wall, the outer side radially of said wall comprising a sealing surface adapted to cooperate in sealing engagement with the sealing surface of a container and the inner side radially of said wall comprising the outside surface of said wall, said diaphragm extending in a plane normal to the center line of said wall and disposed at the bottom edge of said wall and closing the area within said wall, said rim extending outwardly from the top edge of said wall, and said skirt depending from the outer edge of said rim and opposed to the sealing surface of said wall, said closure being characterized in that said outside surface of said wall includes a lower portion from said bottom edge to beyond the midpoint longitudinally of said wall, said lower portion being straight longitudinally of said wall and normal to the plane defined by said bottom edge and being formed in cross-section with increasing and decreasing lateral dimensions relative to said center line to define ridges, and said sealing surface being formed with a reduced lateral dimension substantially at the midpoint longitudinally of said wall and an increased lateral dimension adjacent to the bottom edge of said wall to define a bead of increased thickness about the bottom edge of said wall.

2. A plastic closure for containers in accordance with claim 1 in which said diaphragm, rim and skirt are of substantially uniform thickness and said wall has a thickness that varies between a minimum substantially at the midpoint longitudinally thereof and a maximum at said bead.

3. A plastic closure for containers in accordance with claim 1 in which said closure is injection molded and said diaphragm, rim and skirt are of substantially uniform thickness, and said wall has a thickness at said bead greater than said uniform thickness and substantially at the midpoint longitudinally thereof has a thickness between a maximum thickness at the top of said ridges that is greater than said uniform thickness and a minimum thickness at the bottom of said ridges that is less than said uniform thickness.

4. A plastic closure for containers in accordance with claim 1 in which said wall has an upper portion that extends from the top of said lower portion to said rim, said upper portion having a lateral dimension relatively to said center line that increases progressively from the top of said lower portion to said rim to define a smoothly curved transition between the same, said upper portion being adapted to receive the bead at the bottom edge of said wall of an adjacent closure when a plurality of the closures are stacked.

5. A plastic closure for containers in accordance with claim 1 in which a disk is seated on the top of said diaphragm, said disk having a lateral dimension whereby it is press-fitted between said ridges and frictionally held thereby, said disk serving to reinforce said diaphragm and to provide a printing surface.

References Cited

UNITED STATES PATENTS

| | | | |
|---|---|---|---|
| 2,195,379 | 3/1940 | Kempe | 215—38 |
| 2,218,718 | 10/1940 | Price | 215—38 |
| 3,209,934 | 10/1965 | Salminen | 215—41 |

DONALD F. NORTON, *Primary Examiner.*